United States Patent
Hyodo et al.

(10) Patent No.: US 11,401,695 B2
(45) Date of Patent: Aug. 2, 2022

(54) WORK MACHINE

(71) Applicant: HITACHI CONSTRUCTION MACHINERY CO., LTD., Tokyo (JP)

(72) Inventors: Koji Hyodo, Kasumigaura (JP); Masaki Yoshikawa, Kasama (JP); Kazuyuki Ito, Kobe (JP); Tetsuji Tanaka, Abiko (JP); Kouji Shimazaki, Akashi (JP); Isamu Aoki, Tsukuba (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 17/272,673

(22) PCT Filed: Dec. 25, 2019

(86) PCT No.: PCT/JP2019/050790
§ 371 (c)(1),
(2) Date: Mar. 2, 2021

(87) PCT Pub. No.: WO2020/194952
PCT Pub. Date: Oct. 1, 2020

(65) Prior Publication Data
US 2021/0270016 A1    Sep. 2, 2021

(30) Foreign Application Priority Data
Mar. 27, 2019    (JP) .............................. JP2019-060857

(51) Int. Cl.
*F01P 11/14*    (2006.01)
*F01P 11/16*    (2006.01)
(Continued)

(52) U.S. Cl.
CPC ................ *E02F 9/26* (2013.01); *B60K 11/02* (2013.01); *F01P 5/04* (2013.01); *F01P 11/16* (2013.01); *E02F 3/283* (2013.01)

(58) Field of Classification Search
CPC . B60K 11/02; F01P 11/12; F01P 11/14; F01P 11/16; F01P 2011/063; E02F 9/26
See application file for complete search history.

(56) References Cited

U.S. PATENT DOCUMENTS

2002/0104491 A1* 8/2002 Izumi .................... E02F 9/0866
                                                                    123/41.49
2007/0146148 A1* 6/2007 Kawasaki ............ B60H 3/0616
                                                                    340/607
(Continued)

FOREIGN PATENT DOCUMENTS

JP    02-130216 A    5/1990
JP    09-132041 A    5/1997
(Continued)

OTHER PUBLICATIONS

International Search Report of PCT/JP2019/050790 dated Feb. 10, 2020.

*Primary Examiner* — Long T Tran
(74) *Attorney, Agent, or Firm* — Mattingly & Malur, PC

(57) ABSTRACT

Provided is a work machine capable of notifying that maintenance is necessary due to continuation of clogging in a cooling device or decrease in cooling performance. A wheel loader 1 including a radiator 31 and an oil cooler 32 comprises a controller 5, 5A configured to determine a clogging continuation state of the radiator 31 or the oil cooler 32. The controller 5, 5A determines whether clogging is occurring in the radiator 31 or the oil cooler 32 based on outside air temperature AW and cooling water temperature CW or hydraulic oil temperature HW, determines whether the clogging continues based on a clogging occurrence ratio R1, R2 while an engine 30 is operating, and outputs a notification command signal for providing the alarm buzzer (Continued)

61 and the user management system 62 with a command to notify that maintenance is necessary when it is determined that the clogging continues.

7 Claims, 13 Drawing Sheets

(51) Int. Cl.
    *B60K 11/02*         (2006.01)
    *E02F 9/26*          (2006.01)
    *F01P 5/04*          (2006.01)
    *E02F 3/28*          (2006.01)

(56) References Cited

U.S. PATENT DOCUMENTS

| | | | |
|---|---|---|---|
| 2016/0046181 A1* | 2/2016 | Nishimura | F01N 3/2066 |
| | | | 180/309 |
| 2018/0222313 A1* | 8/2018 | Takii | B60K 13/04 |
| 2020/0011025 A1* | 1/2020 | Hyodo | B60K 11/02 |

FOREIGN PATENT DOCUMENTS

| | | |
|---|---|---|
| JP | 2005-500935 A | 1/2005 |
| JP | 2012-196146 A | 10/2012 |

\* cited by examiner

WORK MACHINE

TECHNICAL FIELD

The present invention relates to a work machine including a cooling device such as a radiator for cooling the cooling water of an engine and an oil cooler for cooling the hydraulic oil for actuating a working device.

BACKGROUND ART

A work machine is equipped with a cooling fan configured to introduce the outside air and blow it toward a cooling device. Since dust or the like spreads in a work site where the work machine is used, the cooling fan is likely to introduce the dust or the like together with the outside air inside a vehicle body. When the dust or the like is blown into the cooling device, the cooling device may be clogged, resulting in overheating of the hydraulic oil or the cooling water of the engine.

Because of the above, for example, Patent Literature 1 discloses a work vehicle configured that a wind speed sensor detects the wind speed of the engine cooling air passing through a dust-proof net of an intake port for the engine cooling air, and a control means outputs a signal for activating an alarm device to a drive circuit when the wind speed detected by the wind speed sensor is equal to or more than the setting wind speed due to occurrence of clogging in the dust-proof net to activate the alarm device, thereby warning the work vehicle that the dust-proof net should be cleaned. Cleaning of the dust-proof net is performed by driving an engine cooling fan, which introduces the engine cooling air and supplies it to a radiator for cooling the engine, to rotate in the reverse direction and blowing the air toward the air intake port so as to blow off the dust adhering to the dust-proof net of the air intake port.

CITATION LIST

Patent Literature

Patent Literature 1: JP-A-H09-132041

SUMMARY OF INVENTION

Technical Problem

The work vehicle disclosed in Patent Literature 1 is configured to activate the alarm device when occurrence of clogging in the dust-proof net is detected, however, it does not determine whether the clogging in the dust-proof net continues. With this configuration, since an operator is not notified that maintenance of the dust-proof net is necessary, the operator cannot determine whether the current situation needs maintenance of the dust-proof net.

In view of the above, an object of the present invention is to provide a work machine capable of notifying that maintenance is necessary due to continuation of clogging in a cooling device or decrease in cooling performance.

Solution to Problem

In order to achieve the object above, the present invention provides A work machine comprising: a main body; an engine mounted on the main body; a working device attached to the main body and driven by hydraulic pressure; a cooling device configured to cool at least cooling water for cooling the engine or hydraulic oil for actuating the working device; and a cooling fan configured to introduce outside air and blow the outside air toward the cooling device, wherein the work machine further comprises: an outside air temperature sensor configured to detect outside air temperature; a fluid temperature sensor configured to detect at least cooling water temperature or hydraulic oil temperature; a controller configured to determine a clogging continuation state in the cooling device; and a notification device configured to notify that maintenance of the cooling device is necessary due to continuation of the clogging in the cooling device, and the controller is further configured to: determine whether clogging is occurring in the cooling device based on the outside air temperature detected by the outside air temperature sensor and fluid temperature detected by the fluid temperature sensor; determine whether the clogging continues in the cooling device based on a clogging occurrence ratio in the cooling device while the engine is operating; and in a case of determining that the clogging continues in the cooling device, output a notification command signal for providing the notification device with a command to notify that maintenance of the cooling device is necessary.

Advantageous Effects of Invention

According to the present invention, it is possible to notify that maintenance is necessary due to continuation of clogging in a cooling device or decrease in cooling performance. The problems, configurations, and effects other than those described above will be clarified by explanation of the embodiments below.

BRIEF DESCRIPTION OF DRAWINGS

FIG. 4 illustrates a timing chart of a relationship between cooling water temperature or hydraulic oil temperature and an interval time of forward/reverse rotation of a cooling fan, specifically.

FIG. 12 illustrates a timing chart of a relationship between determination of decrease in cooling performance and time measurement in a modification, specifically.

DESCRIPTION OF EMBODIMENTS

Hereinafter, as one of the aspects of a work machine according to each embodiment of the present invention, a wheel loader configured to perform loading work by excavating such as earth and sand and minerals in a strip mine, etc., and loading them into such as a dump truck will be described.

<Overall Configuration of Wheel Loader 1>

Firstly, an overall configuration of a wheel loader 1 will be described with reference to FIG. 1.

Figure 1:
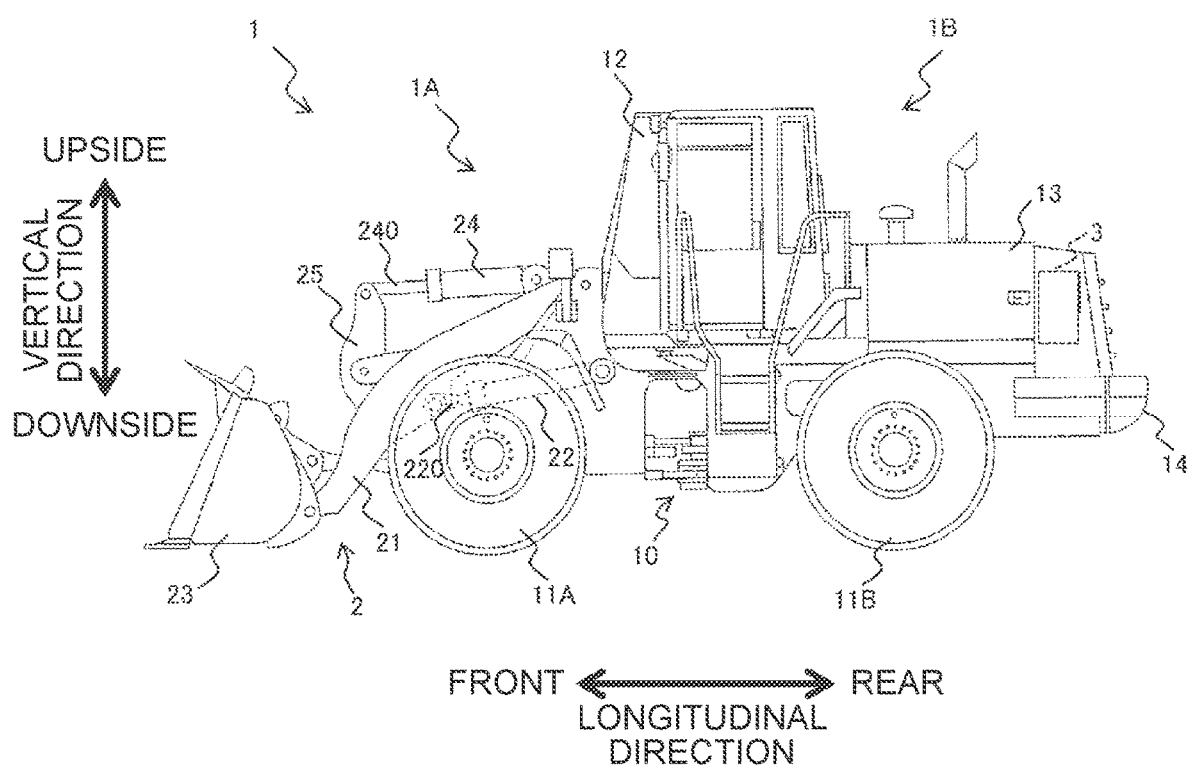
FIG. 1 is a side view illustrating appearance of a wheel loader according to each embodiment of the present invention.

FIG. 1 is a side view illustrating appearance of the wheel loader 1 according to each embodiment of the present invention.

The wheel loader 1 is an articulated type work vehicle which is swiveled on a central portion of a vehicle body (main body) and steered thereby. Specifically, a front frame 1A that is a front part of the vehicle body and a rear frame 1B that is a rear part of the vehicle body are connected to each other by a center joint 10 to swivel in the left and right direction so that the front frame 1A is bent in the left and right direction with respect to the rear frame 1B.

The wheel loader 1 includes four wheels on its entire vehicle body. A pair of left and right front wheels 11A is provided on the front frame 1A, and a pair of left and right rear wheels 11B is provided on the rear frame 1B. FIG. 1 illustrates, among the four wheels, only the left front wheel 11A of the pair of left and right front wheels 11A and the left rear wheel 11B of the pair of left and right rear wheels 11B.

On the front part of the front frame 1A, a working device 2 driven by hydraulic pressure is mounted. The working device 2 includes a lift arm 21 of which base end is attached to the front frame 1A, two lift arm cylinders 22 for driving the lift arm 21, a bucket 23 attached to a front end of the lift arm 21, a bucket cylinder 24 for driving the bucket 23, a bell crank 25 that is rotatably connected to the lift arm 21 and constitutes a link mechanism between the bucket 23 and the bucket cylinder 24, and a plurality of conduits (not illustrated) for leading pressure oil to the two lift arm cylinders 22 and the bucket cylinder 24. Each of the two lift arm cylinders 22 and the bucket cylinder 24 is one of the aspects of a hydraulic actuator for driving the working device 2.

The hydraulic oil flows into or from the two lift arm cylinders 22, which makes expands and contracts a rod 220 of each of the two lift arm cylinders 22, and thus the lift arm 21 is rotated in the vertical direction with respect to the front frame 1A. More specifically, when a bottom chamber of each of the two lift arm cylinders 22 is supplied with the hydraulic oil to expand the rods 220, the lift arm 21 is rotated in the upward direction, and when a rod chamber of each of the two lift arm cylinders 22 is supplied with the hydraulic oil to contract the rods 220, the lift arm 21 is rotated in the downward direction. FIG. 1 illustrates, among the two lift arm cylinders 22 arranged in the lateral direction of the vehicle body, only the lift arm cylinder 22 disposed on the left side by a dashed line.

The hydraulic oil flows into or from the bucket cylinder 24, which expands and contracts a rod 240 of the bucket cylinder 24, and thus the bucket 23 is rotated in the vertical direction with respect to the lift arm 21. More specifically, when a bottom chamber of the bucket cylinder 24 is supplied with the hydraulic oil to expand the rod 240, the bucket 23 is tilted (rotated in the upward direction with respect to the lift arm 21), and when a rod chamber of the bucket cylinder 24 is supplied with the hydraulic oil to contract the rod 240, the bucket cylinder 24 is dumped (rotated in the downward direction with respect to the lift arm 21). In this connection, the bucket 23 can be replaced with various attachments such as a blade, and in addition to the excavation operation using the bucket 23, various operations such as a dozing operation and a snow removing operation can be performed.

The rear frame 1B is further provided with an operator's cab 12 to be boarded by an operator, a mechanical room 13 that accommodates devices such as an engine, a hydraulic pump, and a controller which will be described later, and a counterweight 14 for maintaining balance between the vehicle body and the working device 2 to prevent the vehicle body from tilting. In the rear frame 1B, the operator's cab 12 is disposed on the front, the counterweight 14 is disposed on the rear, and the mechanical room 13 is disposed between the operator's cab 12 and the counterweight 14, respectively. Within the mechanical room 13, a cooling unit 3 configured to cool the cooling water for cooling the engine and the hydraulic oil for actuating the working device 2 is mounted on the rear portion thereof.

<Configuration of Cooling Unit 3>

Next, a configuration of the cooling unit 3 will be described with reference to FIG. 2.

Figure 2:
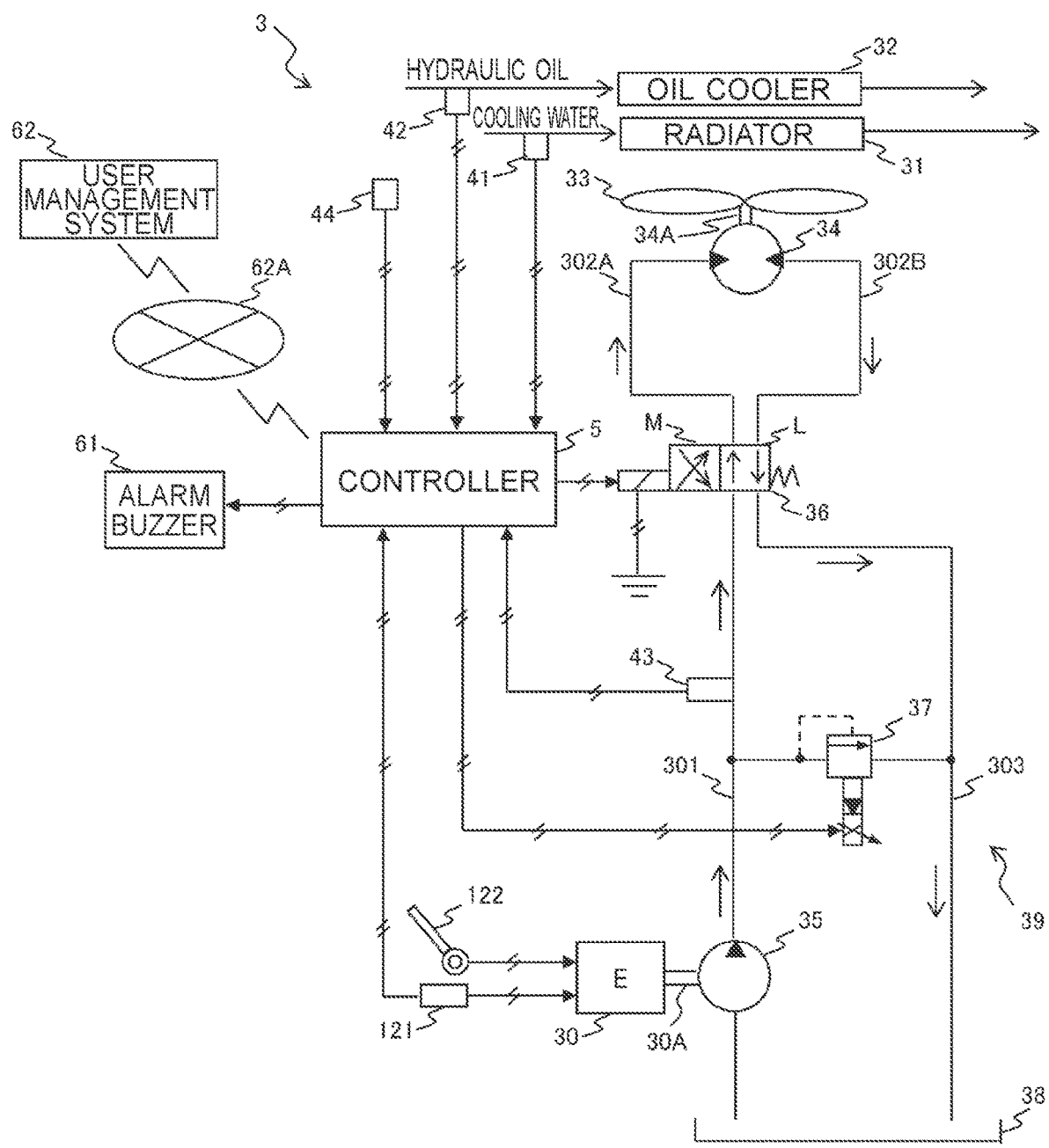
FIG. 2 illustrates an example of a configuration of a cooling unit 3.

FIG. 2 illustrates an example of the configuration of the cooling unit 3.

The cooling unit 3 includes an engine 30, a radiator 31 as a cooling device configured to cool the cooling water for cooling the engine 30, an oil cooler 32 as the cooling device configured to cool the hydraulic oil for actuating the working device 2, a cooling fan 33 configured to introduce the outside air (cooling air) and blow it toward the radiator 31 and the oil cooler 32, and a cooling fan drive device 39 configured to drive the cooling fan 33.

The cooling fan drive device 39 includes a hydraulic motor 34 configured to rotate the cooling fan 33, a hydraulic pump 35 configured to supply the hydraulic oil to the hydraulic motor 34, a direction switching valve 36 configured to switch a flow direction of the hydraulic oil to be supplied from the hydraulic pump 35 to the hydraulic motor 34, and a variable relief valve 37 configured to adjust the rotational speed of the hydraulic motor 34.

The radiator 31 is configured to exchange heat with the cooling air introduced from the cooling fan 33 so as to cool the cooling water which has been heated by the engine 30. The cooling water cooled by the radiator 31 returns to the engine 30 again. The temperature of the cooling water is detected by a cooling water temperature sensor 41 provided on the inlet side of the radiator 31.

Similarly, the oil cooler 32 is configured to exchange heat with the cooling air introduced from the cooling fan 33 so as to cool the hydraulic oil discharged from a hydraulic pump for loading (not illustrated), which is different from the hydraulic pump 35, and then heated by each hydraulic actuator. The hydraulic oil cooled by the oil cooler 32 returns to the hydraulic oil tank 38. The temperature of the hydraulic oil is detected by a hydraulic oil temperature sensor 42 provided on the inlet side of the oil cooler 32. In this connection, the hydraulic oil temperature sensor 42 is not necessarily provided on the inlet side of the oil cooler 32, but for example, may be provided in the hydraulic oil tank 38.

When an operator operates an ignition switch 121 to turn it to the ON position, the engine 30 is activated (started), and thereafter, when the operator steps on an accelerator pedal 122, the engine 30 is rotated. The rotational speed of the engine 30 is proportional to a step-on amount of the accelerator pedal 122, and thus as the step-on amount of the accelerator pedal 122 increases, the rotational speed of the engine 30 also increases. Both the ignition switch 121 and the accelerator pedal 122 are provided in the operator's cab 12 (see FIG. 1).

The hydraulic pump 35 is connected to the engine 30 via an output shaft 30A and is driven by the rotational force of the engine 30. The discharge flow rate of the hydraulic pump 35 varies in accordance with the rotational speed of the engine 30, and as the rotational speed of the engine 30 increases, the discharge flow rate of the hydraulic pump 35 also increases. In the present embodiment, as the hydraulic pump 35, a fixed displacement hydraulic pump is used.

The direction switching valve 36 is a solenoid direction switching valve, and is provided between the hydraulic pump 35 and the hydraulic motor 34.
Specifically, the direction switching valve 36 is connected to a discharge port of the hydraulic pump 35 via a delivery conduit 301 and to an inflow/outflow port of the hydraulic motor 34 via a pair of connecting conduits 302A, 302B, respectively. In addition, the direction switching valve 36 is connected to the hydraulic oil tank 38 via a discharge conduit 303.

The direction switching valve 36 is switched between a forward rotation position L for rotating the hydraulic motor 34 in the forward direction and a reverse rotation position M for rotating the hydraulic motor 34 in the reverse direction at each predetermined interval time in accordance with a switching command signal output from the controller 5. With this configuration, the cooling fan 33 connected to the hydraulic motor 34 via the output shaft 34A of the hydraulic motor 34 is rotated in the forward and reverse directions repeatedly at each predetermined interval time.

When the direction switching valve 36 is switched to the forward rotation position L, as illustrated in FIG. 2, the hydraulic oil discharged from the hydraulic pump 35 is supplied to the hydraulic motor 34 via the delivery conduit 301 and the connecting conduit 302A which is one of the connecting conduits 302A, 302B, and the hydraulic oil supplied to the hydraulic motor 34 is discharged to the hydraulic oil tank 38 via the connecting conduit 302B which is the other one of the connecting conduits 302A, 302B and the discharge conduit 303. With this configuration, the hydraulic motor 34 is rotated in the forward direction.

On the other hand, when the direction switching valve 36 is switched to the reverse rotation position M, the hydraulic oil discharged from the hydraulic pump 35 is supplied to the hydraulic motor 34 via the delivery conduit 301 and the connecting conduit 302B which is the other one of the connecting conduits 302A, 302B, and the hydraulic oil supplied to the hydraulic motor 34 is discharged to the hydraulic oil tank 38 via the connecting conduit 302A which is one of the connecting conduits 302A, 302B and the discharge conduit 303. With this configuration, the hydraulic motor 34 is rotated in the reverse direction.

The variable relief valve 37 is a solenoid variable relief valve, and is provided between the delivery conduit 301 and the discharge conduit 303. The variable relief valve 37 is configured to define the maximum pressure of the hydraulic oil to be supplied from the hydraulic pump 35 to the hydraulic motor 34 in accordance with a command signal output from the controller 5 so as to control the pressure on the delivery side of the hydraulic pump 35. With this configuration, the rotational speed of the hydraulic motor 34 is controlled, thereby making it possible to adjust the rotational speed of the cooling fan 33. The delivery conduit 301 is provided with a pressure sensor 43 for detecting the pressure of the delivery side of the hydraulic pump 35.

The wheel loader 1 is often used in a work site where dust or the like spreads, and thus the cooling fan 33 is likely to introduce the dust or the like together with the outside air into the mechanical room 13. Because of the above, each of the radiator 31 and the oil cooler 32 includes a dust-proof filter (not illustrated) for preventing the dust or the like from entering which is provided on a side facing the cooling fan 33. If the dust-proof filter becomes clogged, the cooling performance decreases and the cooling water or the hydraulic oil may overheat.

Accordingly, the wheel loader 1 is configured such that the controller 5 controls the direction switching valve 36 to rotate the cooling fan 33 in the forward direction and the reverse direction repeatedly at a predetermined interval time so as to remove the dust or the like clogged in the dust-proof filter. In the present embodiment, the controller 5 sets, as the predetermined interval time, a time in which a time while the cooling fan 33 is rotated in the forward direction is combined with a time while the cooling fan 33 is rotated in the reverse direction, meanwhile, the predetermined interval time is not limited thereto. For example, it may be configured to set, as the predetermined interval time, the time while the cooling fan 33 is rotated in the forward direction, and thereafter, rotate the cooling fan 33 in the reverse direction for only a predetermined time.

The controller 5 receives the cooling water temperature CW detected by the cooling water temperature sensor 41, the hydraulic oil temperature HW detected by the hydraulic oil temperature sensor 42, and the outside air temperature AW detected by an outside air temperature sensor 44, respectively, which are used for determination of clogging in the radiator 31 or the oil cooler 32. The outside air temperature sensor 44 is provided on a predetermined position of the outer surface of the vehicle body which is exposed to the outside air (e.g., side face of the rear frame 1B).

Furthermore, the controller 5 is configured to determine not only occurrence of clogging in the radiator 31 or the oil cooler 32, but also a continuation state of the clogging in the radiator 31 or the oil cooler 32, and output a notification command signal to an alarm buzzer 61 and a user management system 62 to notify that maintenance of the radiator 31 or the oil cooler 32 is necessary.

The alarm buzzer 61 is provided in the operator's cab (see FIG. 1), and configured to issue an alarm based on a notification command signal output from the controller 5 so as to notify the operator that it is necessary to inspect the radiator 31 or the oil cooler 32 because clogging continues therein.

The user management system 62 is a management system installed at the side of a user who owns the wheel loader 1. The user management system 62 is connected to the controller 5 via a communication network 62A, and receives a service inspection report based on the notification command signal output from the controller 5.

Each of the alarm buzzer 61 and the user management system 62 is one of the aspects of a notification device for notifying that maintenance is necessary due to continuation of clogging in the radiator 31 or the oil cooler 32. The notification device is not limited to the alarm buzzer 61 and the user management system 62 as long as it can notify the necessity of maintenance due to the continuation of clogging in the radiator 31 or the oil cooler 32. Hereinafter, a function configuration of the controller 5 will be described for each embodiment.

First Embodiment

The function configuration of the controller 5 according to a first embodiment of the present invention will be described with reference to FIG. 3 to FIG. 7.

(Configuration of Controller 5)

Firstly, the configuration of the controller 5 will be described with reference to FIG. 3 and FIG. 4.

Figure 3:
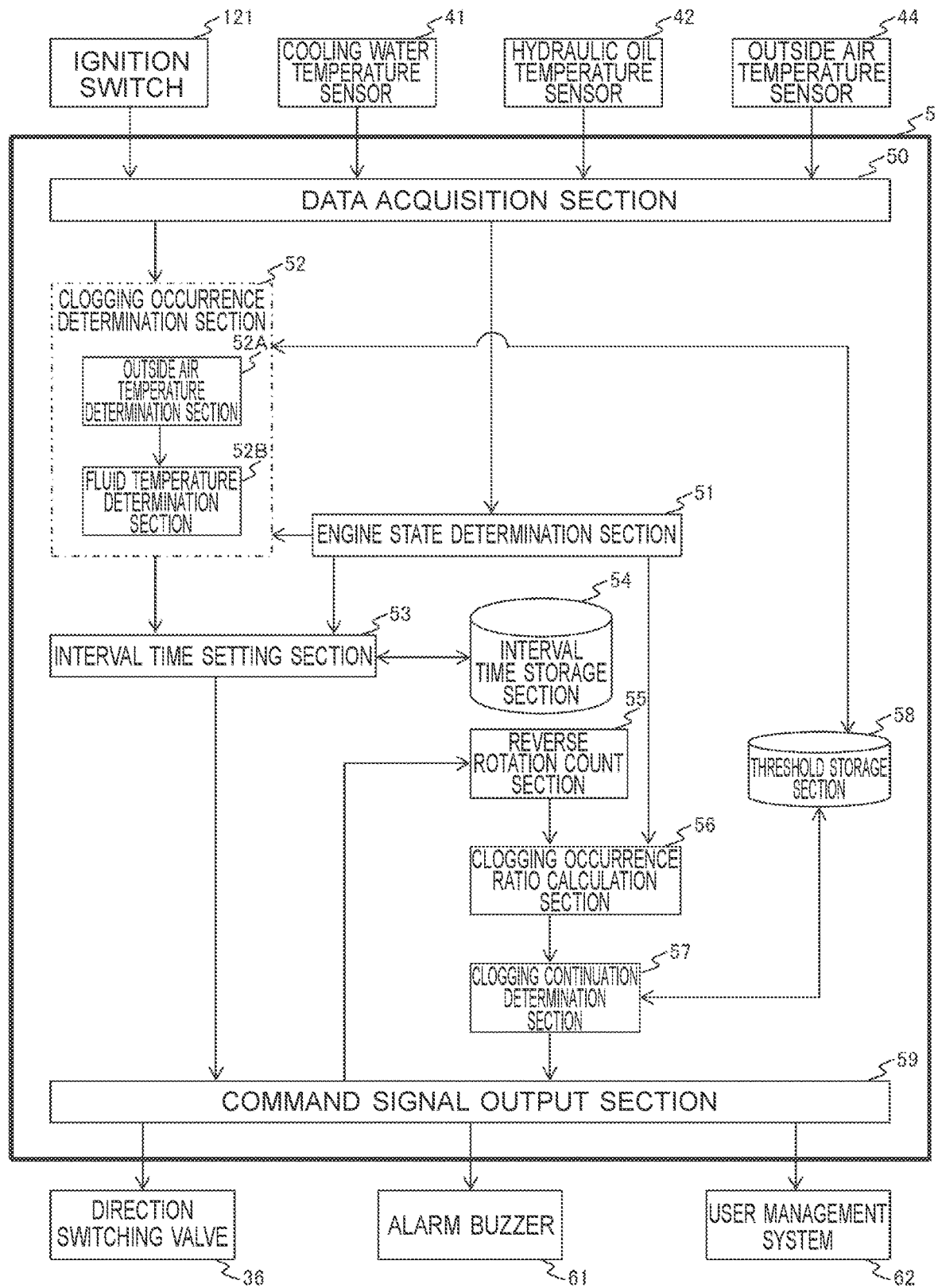
FIG. 3 is a functional block diagram illustrating functions of a controller according to a first embodiment.
Figure 4A:
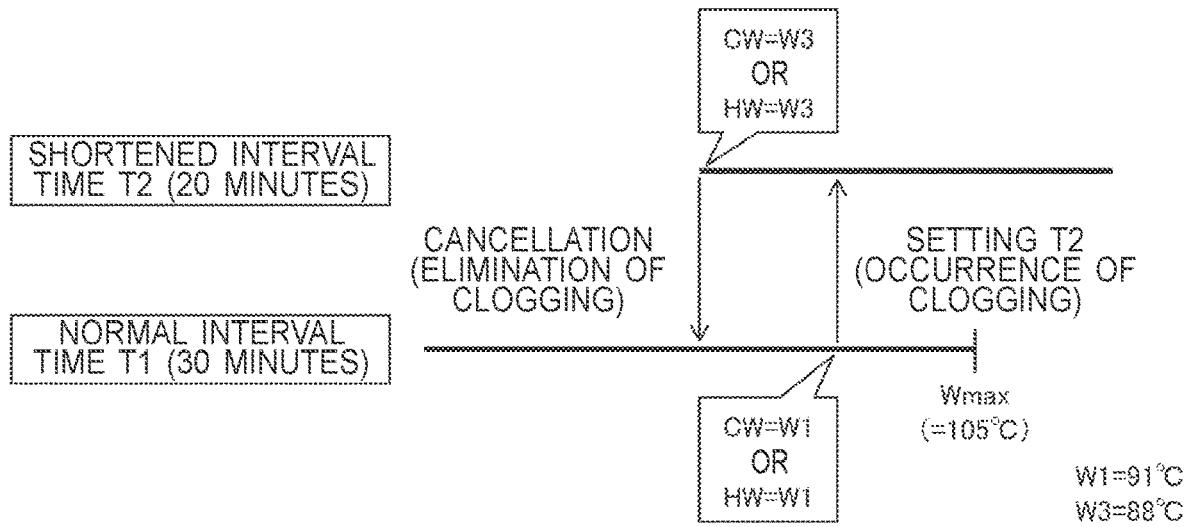
FIG. 4(a) illustrates a case under a low temperature condition.
Figure 4B:
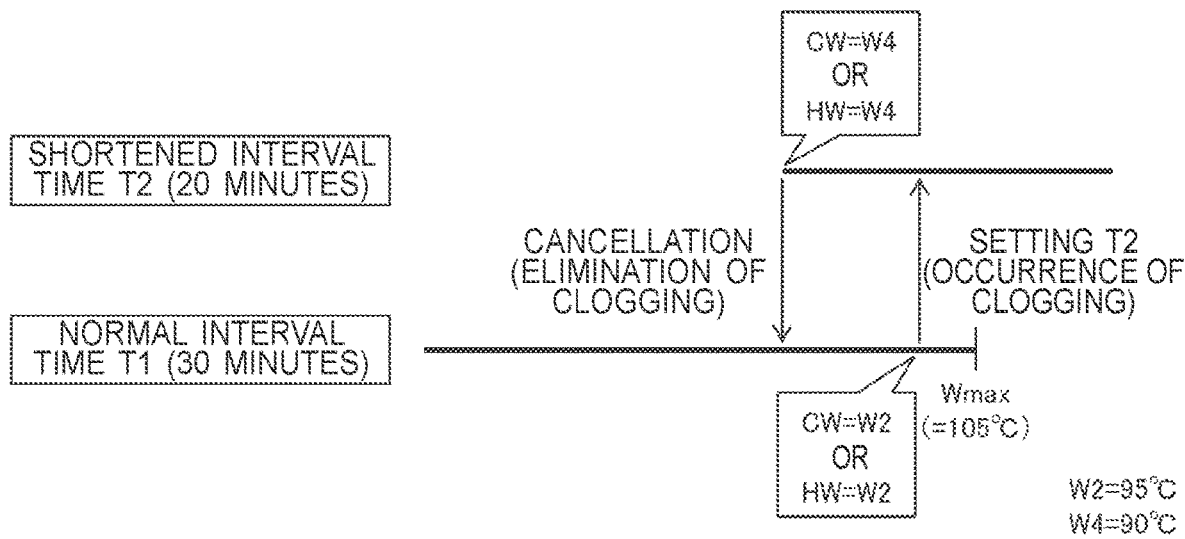
FIG. 4(b) illustrates a case under a high temperature condition.

FIG. 3 is a functional block diagram illustrating the functions of the controller 5 according to the first embodiment. FIG. 4 illustrates a timing chart of a relationship between the cooling water temperature CW or the hydraulic oil temperature HW and an interval time of forward/reverse rotation of the cooling fan 33, specifically, FIG. 4(a) illustrates a case under a low temperature condition, and FIG. 4(b) illustrates a case under a high temperature condition.

The controller 5 is configured such that a CPU, a RAM, a ROM, an HDD, an input I/F, and an output I/F are connected to each other via a bus. Various operation devices such as the ignition switch 121 and various sensors such as the cooling water temperature sensor 41, the hydraulic oil temperature sensor 42, and the outside air temperature sensor 44 are connected to the input I/F. The direction switching valve 36, the alarm buzzer 61, and the user management system 62, etc. are connected to the output I/F.

In this hardware configuration, the CPU reads out a control program (software) stored in a recording medium such as the ROM, the HDD, or an optical disk, expands it on the RAM, and executes the expanded control program. Thereby, the control program and the hardware are operated in cooperation, which realizes the functions of the controller 5.

In the present embodiment, the controller 5 is described by a combination of software and hardware. Meanwhile, the present invention is not limited thereto, but an integrated circuit that realizes the functions of a control program executed on the side of the wheel loader 1 may be used.

As illustrated in FIG. 3, the controller 5 includes a data acquisition section 50, an engine state determination section 51, a clogging occurrence determination section 52, an interval time setting section 53, an interval time storage section 54, a reverse rotation count section 55, a clogging occurrence ratio calculation section 56, a clogging continuation determination section 57, a threshold storage section 58, and a command signal output section 59.

The data acquisition section 50 is configured to acquire data relating to an operation signal output from the ignition switch 121, the cooling water temperature CW detected by the cooling water temperature sensor 41, the hydraulic oil temperature HW detected by the hydraulic oil temperature sensor 42, and the outside air temperature AW detected by the outside air temperature sensor 44, respectively.

The engine state determination section 51 is configured to determine an ON state or an OFF state of the ignition switch 121, that is, an operation state of the engine 30 based on the operation signal from the ignition switch 121 acquired by the data acquisition section 50.

The clogging occurrence determination section 52 includes an outside air temperature determination section 52A and a fluid temperature determination section 52B. When the engine state determination section 51 determines that the engine 30 is operating (ignition switch 121 is in the ON state), the clogging occurrence determination section 52 determines whether clogging is occurring in at least the radiator 31 or the oil cooler 32 based on a determination result of the outside air temperature determination section 52A and the fluid temperature determination section 52B.

The outside air temperature determination section 52A is configured to determine whether the outside air temperature AW acquired by the data acquisition section 50 is lower than a predetermined outside air temperature threshold AWth (hereinafter, simply referred to as "outside air temperature threshold AWth"). Here, the case where the outside air temperature AW is lower than the outside air temperature threshold AWth is referred to as "under the low temperature condition" (AW<AWth), and the case where the outside air temperature AW is equal to or higher than the outside air temperature threshold AWth is referred to as "under the high temperature condition" (AW≥AWth).

When the outside air temperature determination section 52A determines that the outside air temperature AW is under the low temperature condition in which the outside air temperature AW is lower than the outside air temperature threshold AWth (AW<AWth), the fluid temperature determination section 52B determines that the cooling water temperature CW or the hydraulic oil temperature HW acquired by the data acquisition section 50 reaches a predetermined first fluid temperature threshold W1 (hereinafter, simply referred to as "first fluid temperature threshold W1"). When the cooling water temperature CW or the hydraulic oil temperature HW reaches the first fluid temperature threshold W1 (CW≥W1 or HW≥W1), thereafter, the fluid temperature determination section 52B determines whether the cooling water temperature CW or the hydraulic oil temperature HW becomes equal to or lower than a predetermined third fluid temperature threshold W3 (hereinafter simply referred to as "third fluid temperature threshold W3") which is lower than the first fluid temperature threshold W1.

As illustrated in FIG. 4(a), the first fluid temperature threshold W1 is a reference value of the high temperature side under the low temperature condition, and for example, it is set to 91° C. The third fluid temperature threshold W3 is a reference value of the low temperature side under the low temperature condition, and for example, it is set to 88° C.

When the outside air temperature determination section 52A determines that the outside air temperature AW is under the high temperature condition in which the outside air temperature AW is equal to or higher than the outside air temperature threshold AWth (AW≥AWth), the fluid temperature determination section 52B determines whether the cooling water temperature CW or the hydraulic oil temperature HW acquired by the data acquisition section 50 reaches a predetermined second fluid temperature threshold W2 (hereinafter, simply referred to as "second fluid temperature threshold W2"). When the cooling water temperature CW or the hydraulic oil temperature HW reaches the second fluid temperature threshold W2 (CW≥W2 or HW≥W2), thereafter, the fluid temperature determination section 52B determines whether the cooling water temperature CW or the hydraulic oil temperature HW becomes equal to or lower than a predetermined fourth fluid temperature threshold W4 (hereinafter simply referred to as "fourth fluid temperature threshold W4") which is lower than the second fluid temperature threshold W2.

As illustrated in FIG. 4(b), the second fluid temperature threshold W2 is a reference value of the high temperature side under the high temperature condition, and for example, it is set to 95° C. The fourth fluid temperature threshold W4 is a reference value of the low temperature side under the high temperature condition, and for example, it is set to 90° C.

Here, the first to fourth fluid temperature thresholds W1 to W4 are set based on a range of the cooling water temperature from where a thermostat, provided on a conduit connecting the engine 30 and the radiator 31 and opening and closing the conduit, closes it fully to where the thermostat opens it fully (for example, 85° C. to 95° C.)

Specifically, the first fluid temperature threshold W1 and the third fluid temperature threshold W3 are set in a range of the cooling water temperature corresponding to the low temperature condition within the range of the cooling water temperature from the fully closed state of the conduit to the fully opened state thereof by the thermostat. The second fluid temperature threshold W2 and the fourth fluid temperature threshold W4 are set in a range of the cooling water temperature corresponding to the high temperature condition within the range of the cooling water temperature from the fully closed state of the conduit to the fully opened state thereof by the thermostat.

Accordingly, as illustrated in FIG. 4($a$) and FIG. 4($b$), the first fluid temperature threshold W1 is lower than the second fluid temperature threshold W2 (W1<W2), and the third fluid temperature threshold W3 is lower than the fourth fluid temperature threshold W4 (W3<W4). In this connection, the first fluid temperature threshold W1 is set in a range where the cooling water temperature is equal to or lower than the cooling water temperature (95° C.) at which the thermostat fully opens the conduit, and the second fluid temperature threshold W2 is set in a range where the cooling water temperature is equal to or higher than the cooling water temperature (95° C.) at which the thermostat fully opens the conduit, respectively.

When the outside air temperature determination section 52A determines that the outside air temperature AW is under the low temperature condition (AW<AWth) and also when the fluid temperature determination section 52B determines that the cooling water temperature CW or the hydraulic oil temperature HW reaches the first fluid temperature threshold W1 (CW≥W1 or HW≥W1), or when the outside air temperature determination section 52A determines that the outside air temperature AW is under the high temperature condition (AW≥AWth) and also when the fluid temperature determination section 52B determines that the cooling water temperature CW or the hydraulic oil temperature HW reaches the second fluid temperature threshold W2 (CW≥W2 or HW≥W2), the clogging occurrence determination section 52 determines that clogging has occurred at least in the radiator 31 or the oil cooler 32 (hereafter, simply referred to as "occurrence of clogging").

In the present embodiment, since both the first fluid temperature threshold W1 and the second fluid temperature threshold W2 are set to be lower than the temperature Wmax (e.g., 105° C.) at which the cooling water for cooling the engine 30 or the hydraulic oil for actuating the working device 2 overheats (W1<Wmax and W2<Wmax), the operator or the user can grasp the sign of overheating of the cooling water for cooling the engine 30 or the hydraulic oil for actuating the working device 2 before the overheating actually occurs.

Then, when the outside air temperature determination section 52A determines that the outside air temperature AW is under the low temperature condition (AW<AWth) and also when the fluid temperature determination section 52B determines that the cooling water temperature CW or the hydraulic oil temperature HW becomes equal to or lower than the third fluid temperature threshold W3 (CW≤W3 or HW≤H3), or when the outside air temperature determination section 52A determines that the outside air temperature AW is under the high temperature condition (AW≥AWth) and also when the fluid temperature determination section 52B determines that the cooling water temperature CW or the hydraulic oil temperature HW becomes equal to or lower than the fourth fluid temperature threshold W4 (CW≤W4 or HW≤W4), the clogging occurrence determination section 52 determines that the clogging is eliminated in the radiator 31 or the oil cooler 32 (hereinafter, simply referred to as "elimination of clogging").

When the engine state determination section 51 determines that the engine 30 is operating (ignition switch 121 is in the ON state), the interval time setting section 53 sets a predetermined interval time for rotating the cooling fan 33 in the forward direction and the reverse direction (hereinafter, simply referred to as "interval time") to a normal interval time T1. The normal interval time T1 is an initialized interval time, and for example, it is set to 30 minutes.

Furthermore, as illustrated in FIG. 4($a$) and FIG. 4($b$), when the clogging occurrence determination section 52 determines the occurrence of clogging, the interval time setting section 53 sets the interval time for rotating the cooling fan 33 in the forward direction and the reverse direction to a shortened interval time T2 (e.g., 20 minutes) which is shorter than the normal interval time T1. Then, when the clogging occurrence determination section 52 determines the elimination of clogging, the interval time setting section 53 restores (cancels) the interval time for rotating the cooling fan 33 in the forward direction and the reverse direction from the shortened interval time T2 to the normal interval time T1. The interval time storage section 54 is configured to store the normal interval time T1 and the shortened interval time T2, respectively.

The reverse rotation count section 55 is configured to count how frequently the command signal output section 59 outputs a reverse rotation command signal to the direction switching valve 36 while the engine 30 is operating. The reverse rotation command signal is a command signal for switching the rotation direction of the cooling fan 33 from the forward direction to the reverse direction.

More specifically, the reverse rotation count section 55 is configured to count a cumulative number of times of output TN which is the number of times the command signal output section 59 outputs the reverse rotation command signal to the direction switching valve 36 while the engine 30 is operating (hereinafter, simply referred to as "cumulative number of output times TN") and the number of times of output of a clogging signal CN which is the number of times the command signal output section 59 outputs the reverse rotation command signal to the direction switching valve 36 while the clogging occurrence determination section 52 determines that the clogging is occurring (hereinafter, simply referred to as "number of clogging signal output times CN"), respectively.

When the engine state determination section 51 determines that the engine 30 is stopped (ignition switch 121 is in the OFF state), the clogging occurrence ratio calculation section 56 calculates a ratio R1 (=CN/TN) of the number of clogging signal output times relative to the cumulative number of output times, both of which were counted by the reverse rotation count section 55, that is, an occurrence ratio R1 of clogging (hereinafter, simply referred to as "clogging occurrence ratio R1") while the engine 30 is operating.

The clogging continuation determination section 57 is configured to determine whether the clogging continues in at least the radiator 31 or the oil cooler 32 based on the clogging occurrence ratio R1 calculated by the clogging occurrence ratio calculation section 56. Specifically, the clogging continuation determination section 57 determines whether the clogging occurrence ratio R1 calculated by the clogging occurrence ratio calculation section 56 is equal to or more than a predetermined ratio threshold R1$th$ (hereinafter, simply referred to as "ratio threshold R1$th$"). The ratio threshold R1$th$ is set to, for example, 60%.

The threshold storage section 58 is configured to store the outside air temperature threshold AWth, the first to fourth fluid temperature thresholds W1 to W4, and the ratio threshold R1$th$, respectively.

The command signal output section 59 is configured to output, to the direction switching valve 36, a switching command signal for rotating the cooling fan 33 in the forward direction and the reverse direction at the interval time set by the interval time setting section 53, in other words, at the normal interval time T1 or the shortened interval time T2. The switching command signal includes the above-mentioned reverse rotation command signal and a forward rotation command signal for switching the rotation direction of the cooling fan 33 from the reverse direction to the forward direction.

Furthermore, when the clogging continuation determination section 57 determines that the clogging continues in at least the radiator 31 or the oil cooler 32 (hereinafter, simply referred to as "continuation of clogging"), the command signal output section 59 outputs a notification command signal to the alarm buzzer 61 and the user management system 62.

(Processing by Controller 5)

Next, a specific flow of processing executed by the controller 5 will be described with reference to FIG. 5 to FIG. 7.

Figure 5:
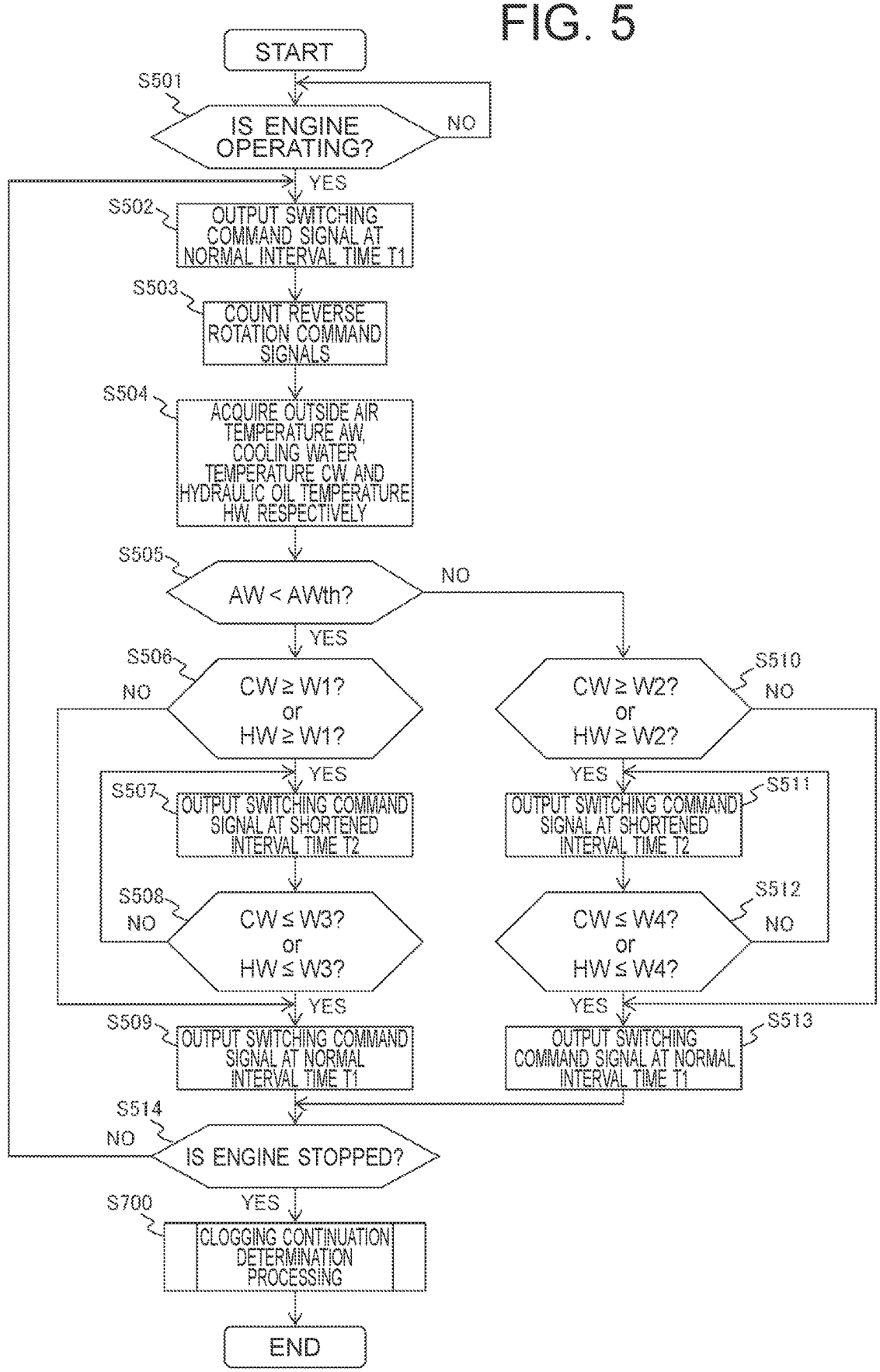
FIG. 5 illustrates a flowchart of entire processing executed by a controller according to the first embodiment.

FIG. 5 illustrates a flowchart of entire processing executed by the controller 5 according to the first embodiment. FIG. 6 illustrates a flowchart of clogging continuation determination processing executed by the controller 5 according to the first embodiment. FIG. 7 explains a method of determining continuation of clogging in the first embodiment.

As illustrated in FIG. 5, firstly, the engine state determination section 51 determines whether the engine 30 is operating based on an operation signal from the ignition switch 121 acquired by the data acquisition section 50 (step S501).

When it is determined in step S501 that the engine 30 is operating (step S501/YES), the interval time setting section 53 sets the interval time for rotating the cooling fan 33 in the forward direction and the reverse direction to the normal interval time T1, and the command signal output section 59 outputs a switching command signal based on the normal interval time T1 to the direction switching valve 36 (step S502). When it is not determined in step S501 that the engine 30 is operating (step S501/NO), the controller 5 does not proceed to or after the step S502 until the engine 30 is started.

At this time, the reverse rotation count section 55 counts the number of times of reverse rotation command signal output among the switching command signal output in step S502 (step S503).

Next, the data acquisition section 50 acquires the outside air temperature AW detected by the outside air temperature sensor 44, the cooling water temperature CW detected by the cooling water temperature sensor 41, and the hydraulic oil temperature HW detected by the hydraulic oil temperature sensor 42, respectively (step S504).

Next, the outside air temperature determination section 52A determines whether the outside air temperature AW acquired in step S504 is lower than the outside air temperature threshold AWth (step S505). When it is determined in step S505 that the outside air temperature AW is lower than the outside air temperature threshold AWth (AW<AWth) (step S505/YES), that is, the outside air temperature AW is under the low temperature condition, the fluid temperature determination section 52B determines whether the cooling water temperature CW or the hydraulic oil temperature HW acquired in step S504 is equal to or higher than the first fluid temperature threshold W1 (step S506).

When it is determined in step S506 that the cooling water temperature CW or the hydraulic oil temperature HW is equal to or higher than the first fluid temperature threshold W1 (CW≥W1 or HW≥W1) (step S506/YES), which means occurrence of clogging is determined, the interval time setting section 53 sets the interval time for rotating the cooling fan 33 in the forward direction and the reverse direction to the shortened interval time T2, and the command signal output section 59 outputs a switching command signal based on the shortened interval time T2 to the direction switching valve 36 (step S507).

Next, the fluid temperature determination section 52B determines whether the cooling water temperature CW or the hydraulic oil temperature HW acquired in step S504 is equal to or lower than the third fluid temperature threshold W3 (step S508). When it is determined in step S508 that the cooling water temperature CW or the hydraulic oil temperature HW is equal to or lower than the third fluid temperature threshold W3 (CW≤W3 or HW≤W3) (step S508/YES), which means elimination of the clogging is determined, the interval time setting section 53 sets the interval time for rotating the cooling fan 33 in the forward direction and the reverse direction to the normal interval time T1 (cancels the setting of the shortened interval time T2), and the command signal output section 59 outputs a switching command signal based on the normal interval time T1 to the direction switching valve 36 (step S509).

In this connection, when it is determined in step S508 that the cooling water temperature CW or the hydraulic oil temperature HW is higher than the third fluid temperature threshold W3 (CW>W3 or HW>W3) (step S508/NO), the controller 5 returns to step S507 and repeats the processing until the cooling water temperature CW or the hydraulic oil temperature HW becomes equal to or lower than the third fluid temperature threshold W3.

When it is determined in step S506 that the cooling water temperature CW or the hydraulic fluid temperature HW is lower than the first fluid temperature threshold W1 (CW<W1 or HW<W1) (step S506/NO), the controller 5 proceeds to step S509 since no clogging is occurring.

On the other hand, when it is determined in step S505 that the outside air temperature AW is equal to or higher than the outside air temperature threshold AWth (AW≥AWth) (step S505/NO), that is, the outside air temperature AW is under the high temperature condition, the fluid temperature determination section 52B determines whether the cooling water temperature CW or the hydraulic oil temperature HW acquired in step S504 is equal to or higher than the second fluid temperature threshold W2 (step S510).

When it is determined in step S510 that the cooling water temperature CW or the hydraulic oil temperature HW is equal to or higher than the second fluid temperature threshold W2 (CW≥W2 or HW≥W2) (step S510/YES), which means occurrence of clogging is determined, in the same manner as step S507, the interval time setting section 53 sets the interval time for rotating the cooling fan 33 in the forward direction and the reverse direction to the shortened interval time T2, and the command signal output section 59 outputs a switching command signal based on the shortened interval time T2 to the direction switching valve 36 (step S511).

Next, the fluid temperature determination section 52B determines whether the cooling water temperature CW or the hydraulic oil temperature HW acquired in step S504 becomes equal to or lower than the fourth fluid temperature threshold W4 (step S512). When it is determined in step S512 that the cooling water temperature CW or the hydraulic oil temperature HW becomes equal to or lower than the fourth fluid temperature threshold W4 (CW≤W4 or HW≤W4) (step S512/YES), which means elimination of the clogging is determined, in the same manner as step S509, the interval time setting section 53 sets the interval time for rotating the cooling fan 33 in the forward direction and the reverse direction to the normal interval time T1, and the command signal output section 59 outputs a switching command signal based on the normal interval time T1 to the direction switching valve 36 (step S513).

In this connection, when it is determined in step S512 that the cooling water temperature CW or the hydraulic oil temperature HW is higher than the fourth fluid temperature threshold W4 (CW>W4 or HW>W4) (step S512/NO), the controller 5 returns to step S511 and repeats the processing until the cooling water temperature CW or the hydraulic oil temperature HW becomes lower than the fourth fluid temperature threshold W4.

When it is determined in step S510 that the cooling water temperature CW or the hydraulic oil temperature HW is lower than the second fluid temperature threshold W2 (CW<W2 or HW<W2) (step S510/NO), the controller 5 proceeds to step S513 since clogging is not occurring.

After completion of step S509 or step S513, the engine state determination section 51 determines whether the engine 30 is stopped based on the operation signal from the ignition switch 121 acquired by the data acquisition section 50 (step S514). When it is determined in step S514 that the engine 30 is stopped (step S514/YES), the controller 5 proceeds to the clogging continuation determination processing (step S700). When it is not determined in step S514 that the engine 30 is stopped (step S514/NO), that is, when the engine 30 is still operating, the controller 5 returns to step S502 and repeats the processing.

Figure 6:
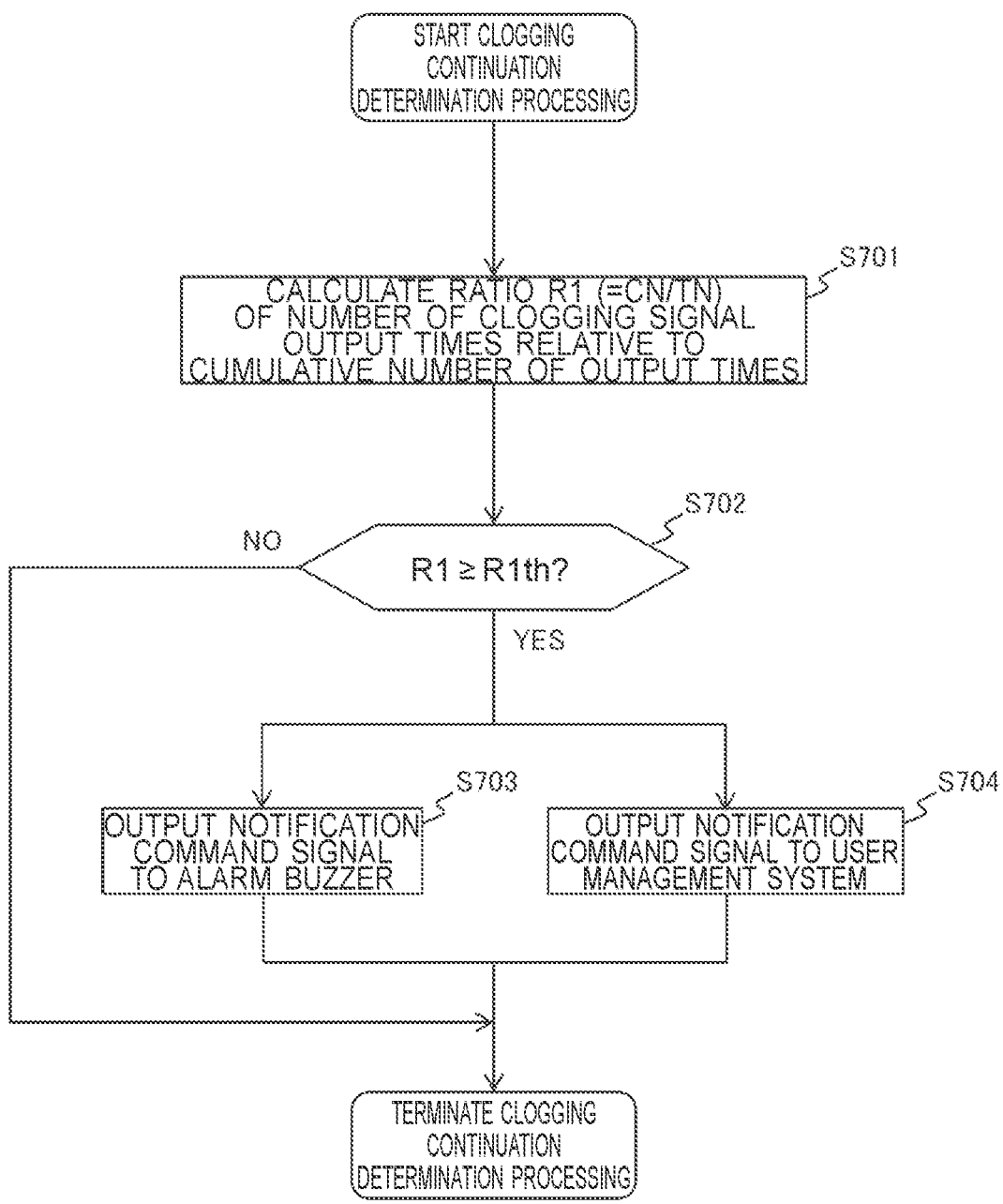
FIG. 6 illustrates a flowchart of clogging continuation determination processing executed by a controller according to the first embodiment.

As illustrated in FIG. 6, in the clogging continuation determination processing (step S700), firstly, the clogging occurrence ratio calculation section 56 calculates, based on the number of reverse rotation command signal output times counted in step S503 of FIG. 5, a ratio R1 (=CN/TN) of the number of clogging signal output times relative to the cumulative number of reverse rotation command signal output times, that is, the clogging occurrence ratio R1 (step S701).

Next, the clogging continuation determination section 57 determines whether the clogging occurrence ratio R1 calculated in step S701 is equal to or more than the ratio threshold R1th (step S702). When it is determined in step S702 that the clogging occurrence ratio R1 is equal to or more than the ratio threshold R1th (R1≥R1th) (step S702/YES), which means continuation of clogging is determined, the command signal output section 59 outputs a notification command signal to the alarm buzzer 61 (step S703) and outputs a notification command signal to the user management system 62 (step S704). Thus, the controller 5 terminates the clogging continuation determination processing (step S700) as well as terminates the entire processing.

When it is determined in step S702 that the clogging occurrence ratio R1 is less than the ratio threshold R1th (R1<R1th) (step S702/NO), which means continuation of clogging is not determined, the controller 5 terminates the clogging continuation determination processing (step S700) as well as terminates the entire processing.

Figure 7:
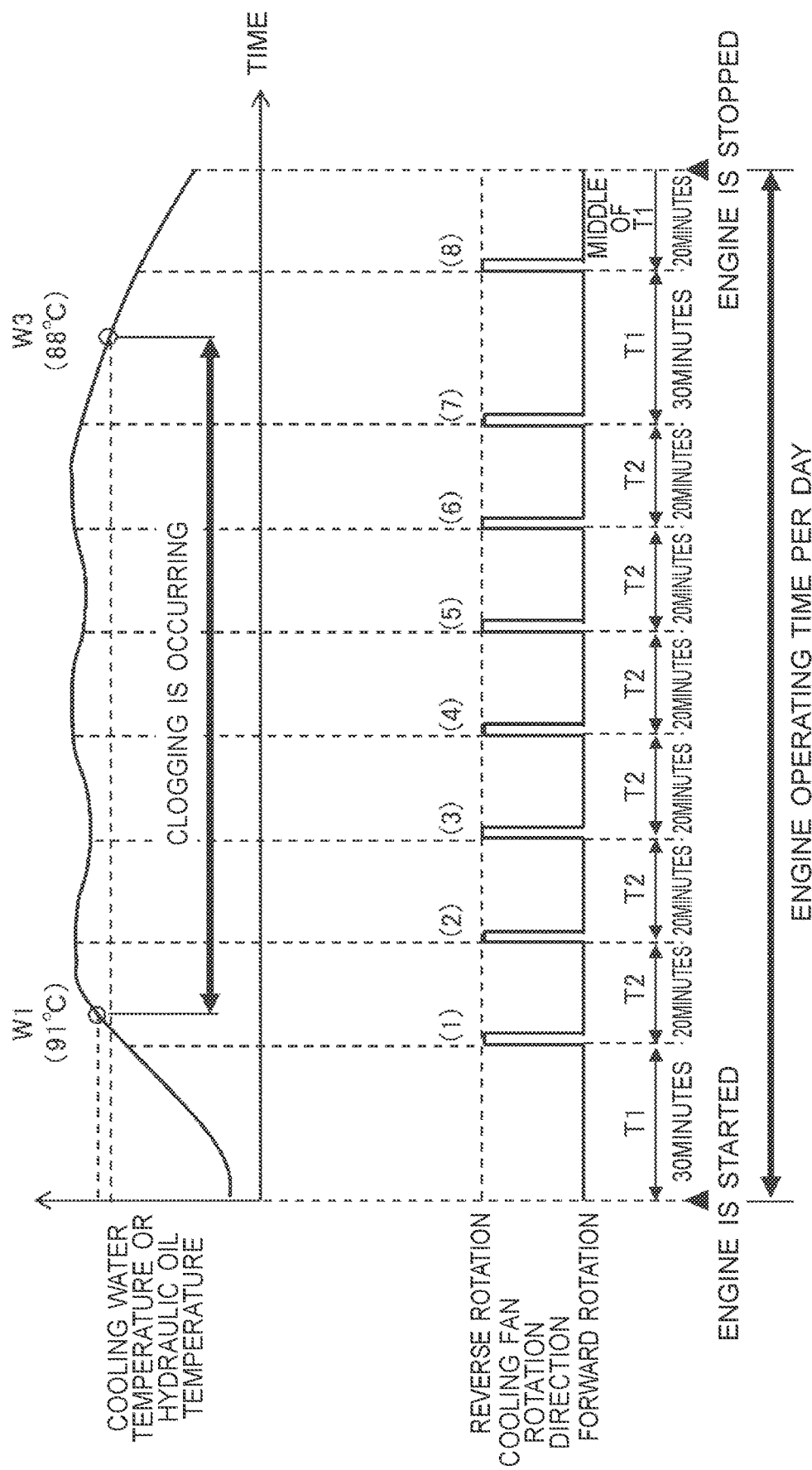
FIG. 7 explains a method of determining continuation of clogging in the first embodiment.

For example, FIG. 7 illustrates a clogging continuation state during an operating time of the engine 30 per day in the case where the outside air temperature AW is 25° C., that is, the outside air temperature AW is under the low temperature condition. As illustrated in FIG. 7, during the period from start (activation) of the engine 30 to its stop, the command signal output section 59 outputs the reverse rotation command signals to the direction switching valve 36 eight times of (1)-(8), among which the command signal output section 59 outputs the reverse rotation command signals to the direction switching valve 36 six times of (2)-(7) while the clogging is occurring.

Since the clogging occurrence ratio R1 is 75% (=6/8× 100%) which is greater than the ratio threshold R1th (=60%), the controller 5 determines that the clogging continues and outputs notification command signals to the alarm buzzer 61 and the user management system 62. The notification device such as the alarm buzzer 61 and the user management system 62 notifies the operator and the user that at least the radiator 31 or the oil cooler 32 has been continuously clogged and maintenance is necessary, so that the operator or the user can recognize the current situation in which maintenance of the radiator 31 or the oil cooler 32 should be performed.

In this connection, in the case of the wheel loader 1, operation of the engine 30 and stop thereof are repeatedly performed in a work day. As illustrated in FIG. 7, when the clogging occurrence ratio R1 while the engine 30 is operating is calculated based on an operating time of the engine 30 per day, it is possible to accurately determine the continuation of clogging. Furthermore, the clogging occurrence ratio R1 while the engine 30 is operating may be calculated based on the operating time of the engine 30 per month, which will be described later as one of the modifications.

In the present embodiment, when the clogging occurrence determination section 52 determines the occurrence of clogging, the interval time setting section 53 sets the interval time for rotating the cooling fan 33 in the forward direction and the reverse direction to the shortened interval time T2 which is shorter than the normal interval time T1 (T2<T1). With this configuration, as the number of times of reverse rotation command signal output while the clogging is occurring increases, the clogging occurrence ratio R1 also increases. As a result, it is possible to determine the continuation of clogging more accurately.

Second Embodiment

Next, a function configuration of a controller 5A according to a second embodiment of the present embodiment will be described with reference to FIG. 8 to FIG. 11. In FIG. 8 to FIG. 11, components common to those described for the wheel loader 1 according to the first embodiment are provided with the same reference signs, and repetitive explanation thereof will be omitted.

Figure 8:
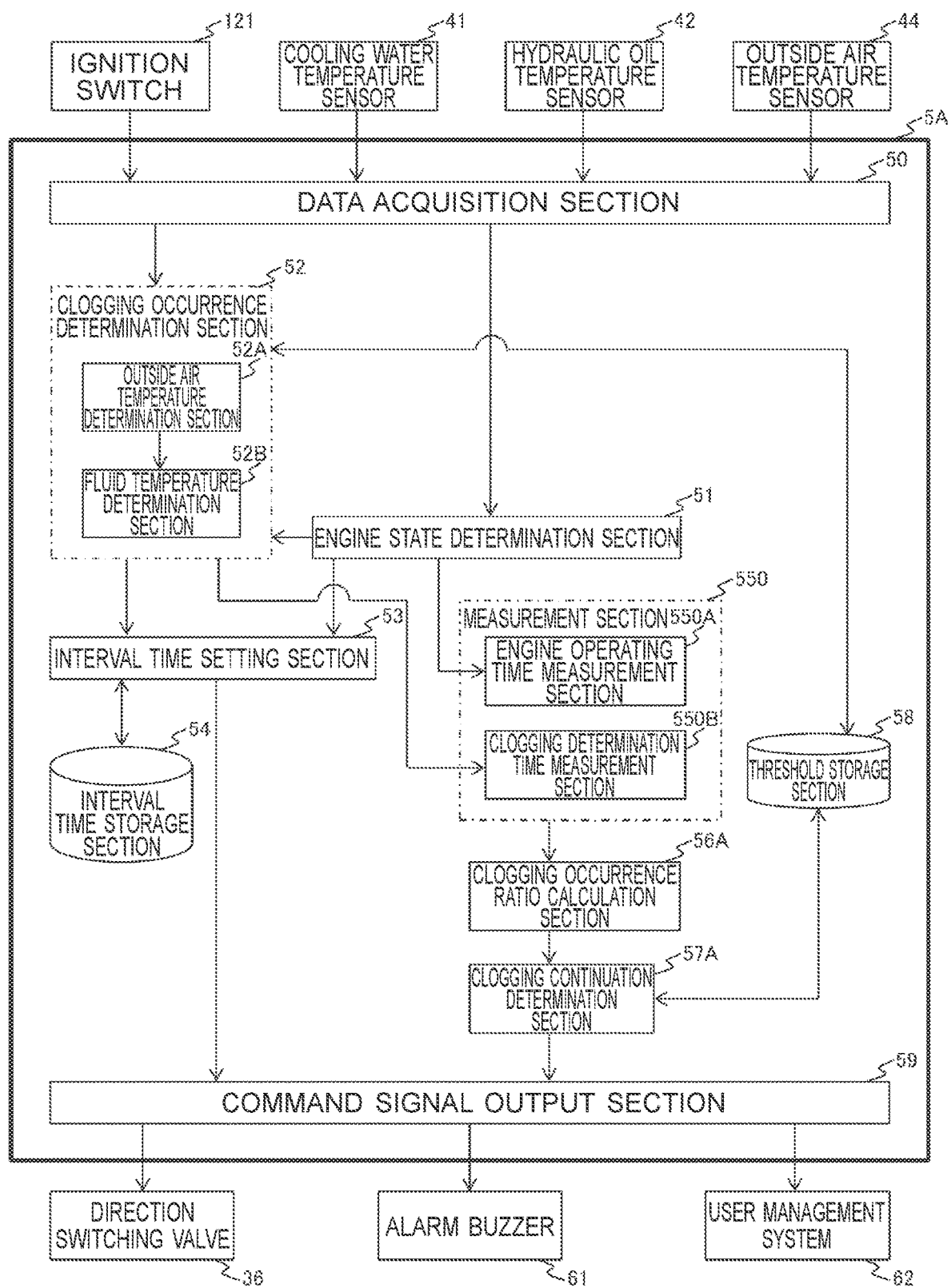
FIG. 8 is a functional block diagram illustrating functions of a controller according to a second embodiment.
Figure 9:
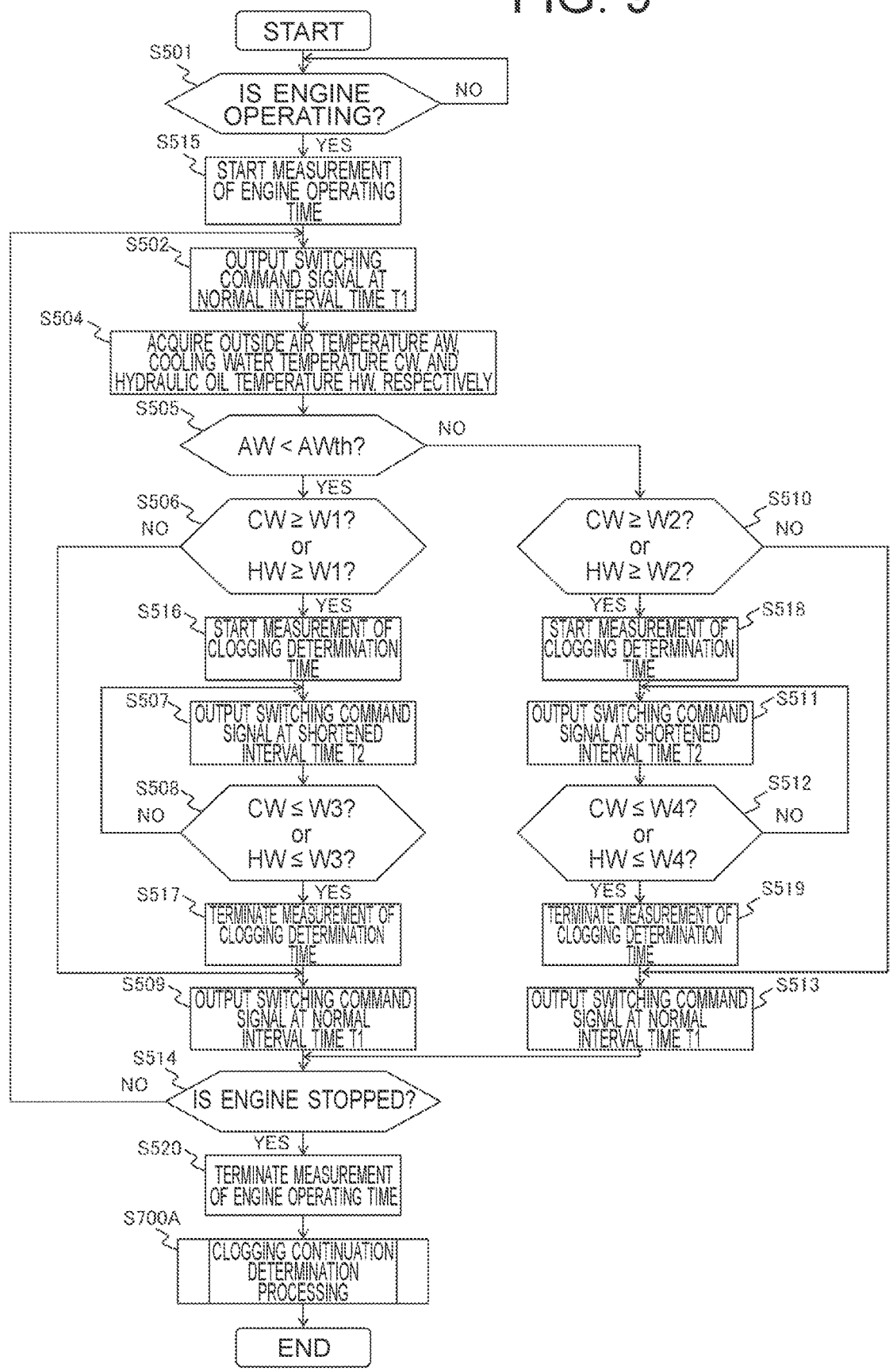
FIG. 9 illustrates a flowchart of entire processing executed by a controller according to the second embodiment.
Figure 10:
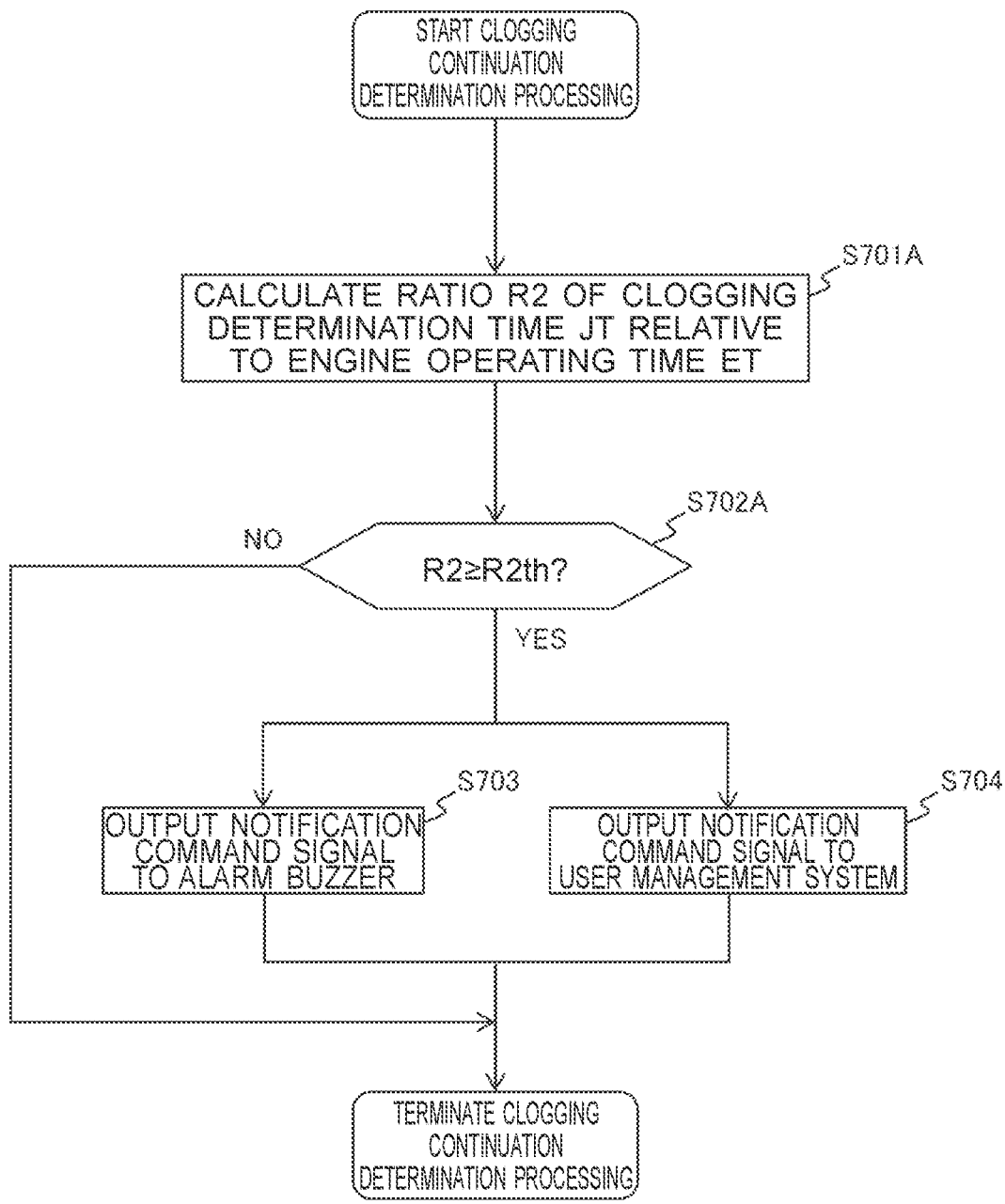
FIG. 10 illustrates a flowchart of clogging continuation determination processing executed by a controller according to the second embodiment.
Figure 11:
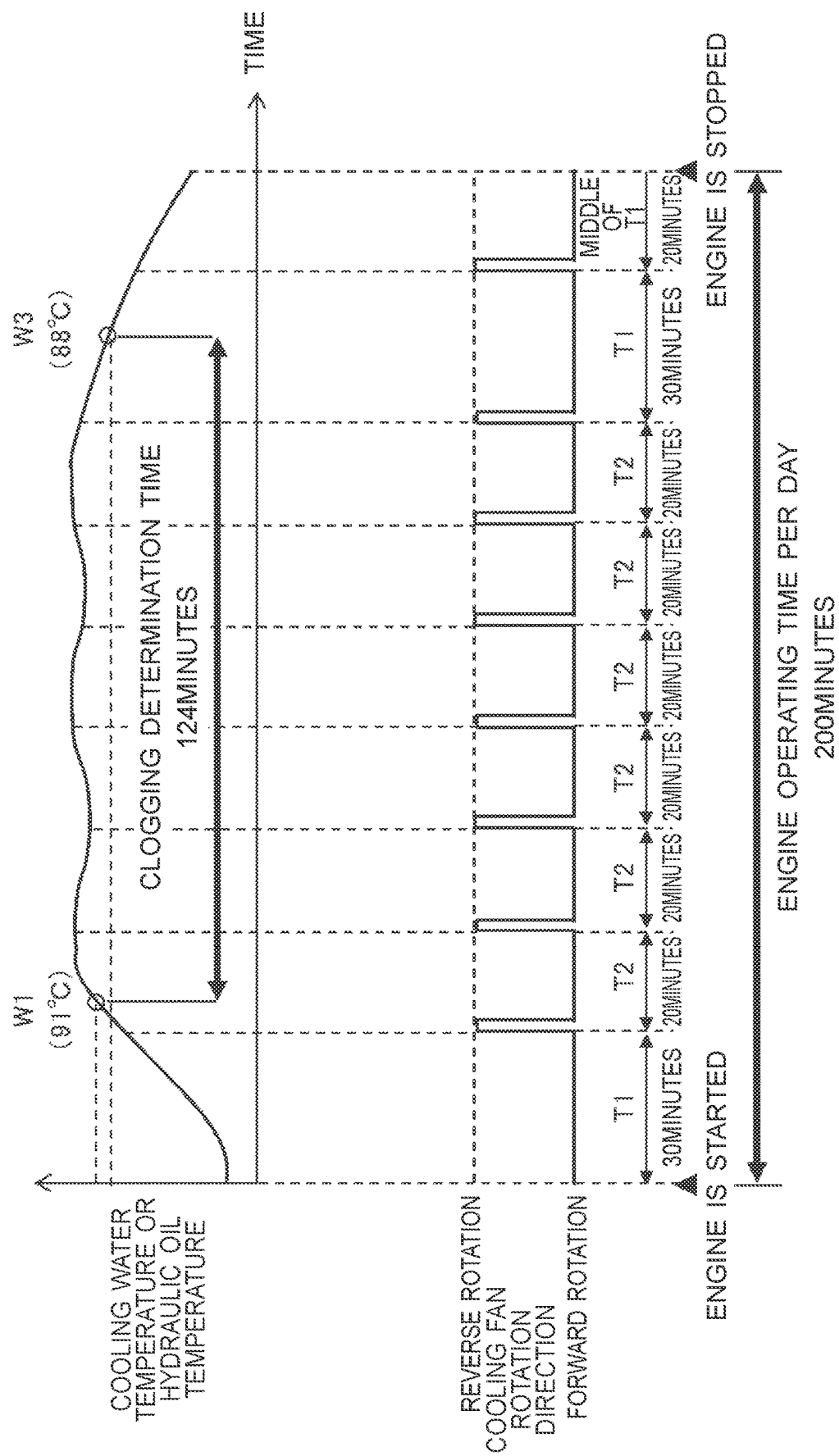
FIG. 11 explains a method of determining continuation of clogging in the second embodiment.

FIG. 8 is a functional block diagram illustrating the functions of the controller 5A according to the second embodiment. FIG. 9 illustrates a flowchart of entire processing executed by the controller 5A according to the second embodiment. FIG. 10 illustrates a flowchart of clogging continuation determination processing executed by the controller 5A according to the second embodiment. FIG. 11 explains a method of determining continuation of clogging in the second embodiment. In this connection, similarly to FIG. 7, FIG. 11 illustrates a clogging continuation state during an operating time of the engine 30 per day in the case where the outside air temperature AW is 25° C., that is, the outside air temperature AW is under the low temperature condition.

The controller 5A according to the present embodiment differs from the controller 5 according to the first embodiment in the methods of determining continuation of clogging. The controller 5 according to the first embodiment includes the reverse rotation count section 55. Meanwhile, as illustrated in FIG. 8, the controller 5A according to the present embodiment includes a measurement section 550 instead of the reverse rotation count section 55. The measurement section 550 includes an engine operating time measurement section 550A and a clogging determination time measurement section 550B.

The engine operating time measurement section 550A is configured to measure a time ET during which the engine 30 is operating (hereinafter, simply referred to as "engine operating time ET").

Specifically, as illustrated in FIG. 9, when it is determined in step S501 that the engine 30 is operating (step S501/YES), the engine operating time measurement section 550A starts measurement of the engine operating time ET (step S515). Then, when it is determined in step S514 that the engine 30 is stopped (step S514/YES), the engine operating time measurement section 550A terminates the measurement of the engine operating time ET (step S520).

The clogging determination time measurement section 550B is configured to measure a clogging determination time of JT (hereinafter, simply referred to as "clogging determination time JT") during which the clogging occurrence determination section 52 determines that clogging is occurring in at least the radiator 31 or the oil cooler 32.

Specifically, as illustrated in FIG. 9, when it is determined in step S506 that the cooling water temperature CW or the hydraulic fluid temperature HW is equal to or higher than the first fluid temperature threshold W1 (CW≥W1 or HW≥W1) (step S506/YES), the clogging determination time measurement section 550B starts measurement of the clogging determination time JT (step S516). Then, when it is determined in step S508 that the cooling water temperature CW or the hydraulic fluid temperature HW is equal to or lower than the third fluid temperature threshold W3 (CW≤W3 or HW≤W3) (step S508/YES), the clogging determination time measurement section 550B terminates the measurement of the clogging determination time JT (step S517).

In the present embodiment, when the measurement of the engine operating time ET is completed in step S520, the controller 5 proceeds to the clogging continuation determination processing (step S700A). As illustrated in FIG. 10, in the clogging continuation determination processing (step S700A), the clogging occurrence ratio calculation section 56A calculates a ratio R2 (=JT/ET) of the clogging determination time JT relative to the engine operating time ET, that is, a clogging occurrence ratio R2 (step S701A).

Next, the clogging continuation determination section 57A determines whether the clogging occurrence ratio R2 calculated in step S701A is equal to or more than a ratio threshold R2th (step S702A). The ratio threshold R2th is set to, for example, 50%.

When it is determined in step S702A that the clogging occurrence ratio R2 is equal to or more than the ratio threshold R2th (R2≥R2th) (step S702A/YES), the controller 5 proceeds to step S703 and step S704. When it is determined in step S702A that the clogging occurrence ratio R2 is less than the ratio threshold R2th (R2<R2th) (step S702A/NO), the controller 5 terminates the clogging continuation determination processing (step S700A) as well as terminates the entire processing.

For example, as illustrated in FIG. 11, when the engine operating time ET measured by the engine operating time measurement section 550A (in FIG. 11, measured based on the operating time of the engine 30 per day) is 200 minutes and the clogging determination time JT measured by the clogging determination time measurement section 550B is 124 minutes, the clogging occurrence ratio R2 is 62% (=124/200×100%). Since the clogging occurrence ratio R2 is more than the ratio threshold R2th (=50%), the controller 5A determines that the clogging continues.

Thus, the clogging occurrence ratio R2 calculated based on the engine operating time ET and the clogging determination time JT may be used for determining whether the clogging continues in at least the radiator 31 or the oil cooler 32. The wheel loader 1 according to the present embodiment also can obtain the same operations and effects as those of the wheel loader 1 according to the first embodiment.

In the above, the embodiments of the present invention have been described. It should be noted that the present invention is not limited to the above-described embodiments, but includes various modifications. For example, a modification of the controller 5A according to the second embodiment will be described with reference to FIG. 12(a) and FIG. 12(b).

Figure 12A:
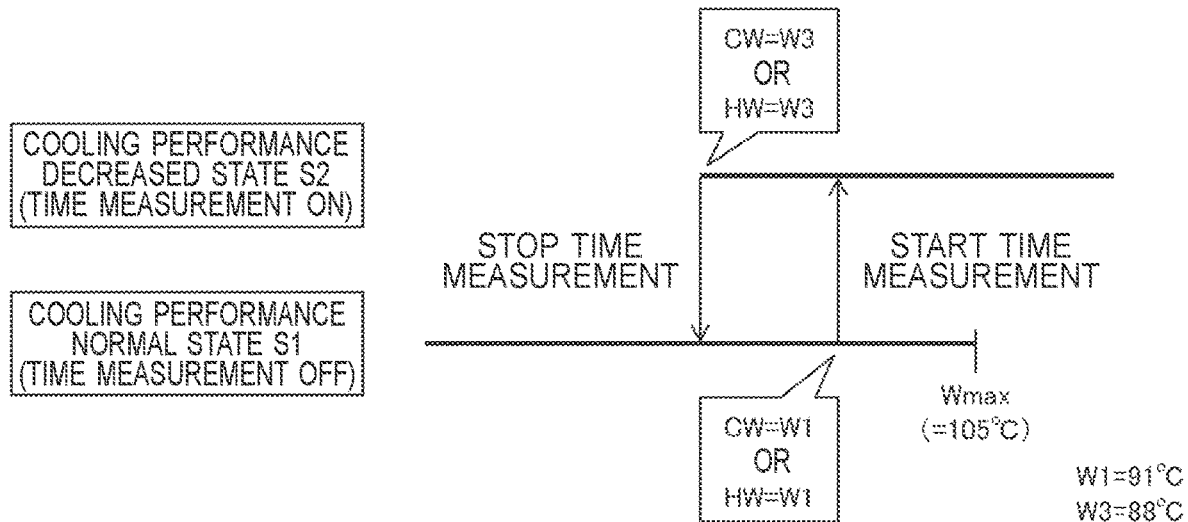
FIG. 12(a) illustrates a case under a low temperature condition.
Figure 12B:
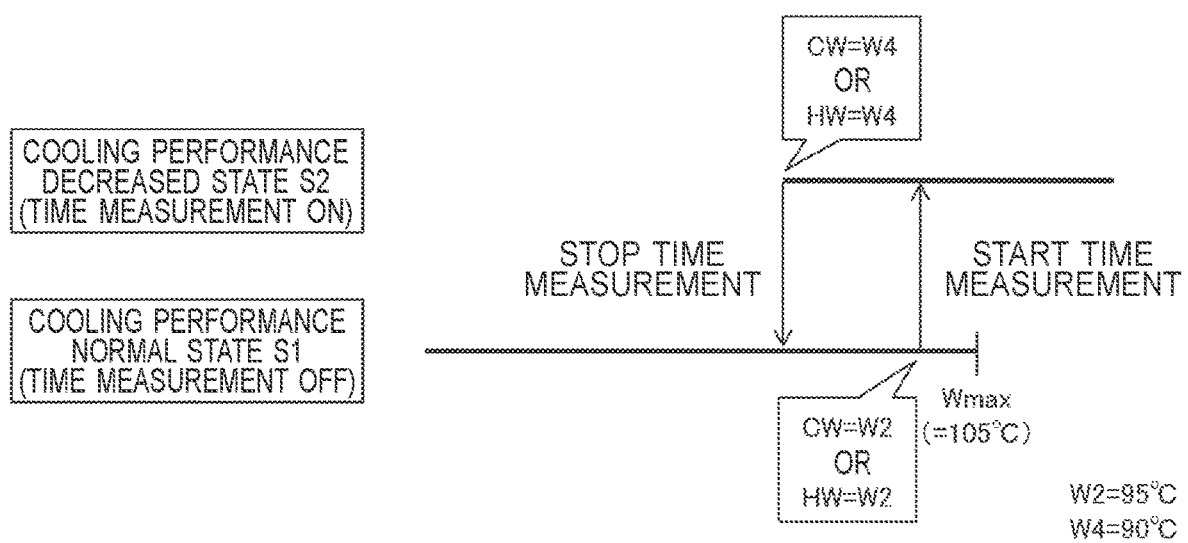
FIG. 12(b) illustrates a case under a high temperature condition.

FIG. 12 illustrates a timing chart of a relationship between determination of decrease in cooling performance and time measurement in the present modification, specifically, FIG. 12(a) illustrates a case under the low temperature condition, and FIG. 12(b) illustrates a case under the high temperature condition.

In the present modification, a cooling performance decreased state S2 and a cooling performance normal state S1 are set in place of the shortened interval time T2 and the normal interval time T1 of the above-described second embodiment. In the case under the low temperature condition, as illustrated in FIG. 12(a), when the cooling water temperature CW or the hydraulic oil temperature HW is equal to or higher than the first fluid temperature threshold W1 (CW≥W1 or HW≥W1), the controller 5A determines that the current situation is the cooling performance decreased state S2 in which the cooling performance of the radiator 31 or the oil cooler 32 is decreased, and measures a cumulative time during which the cooling performance decreased state S2 continues. Then, when the cooling water temperature CW or the hydraulic oil temperature HW becomes equal to or lower than the third fluid temperature threshold W3 (CW≤W3 or HW≤W3), the controller 5A determines that the current situation is the cooling performance normal state S1 in which the cooling performance of the radiator 31 or the oil cooler 32 is normal, and stops the measurement of the cumulative time during which the cooling performance decreased state S2 continues.

Similarly, under the high temperature condition, as illustrated in FIG. 12(b), when the cooling water temperature CW or the hydraulic oil temperature HW is equal to or higher than the second fluid temperature threshold W2 (CW≤W3 or HW≤W3), the controller 5A determines that the current situation is the cooling performance decreased state S2, and measures the cumulative time during which the cooling performance decreased state S2 continues. Then, when the cooling water temperature CW or the hydraulic oil temperature HW becomes equal to or lower than the fourth fluid temperature threshold W4 (CW≤W4 or HW≤W4), the controller 5A determines that the current situation is the cooling performance normal state S1, and stops the measurement of the cumulative time during which the cooling performance decreased state S2 continues.

Furthermore, a modification of a service inspection report based on the notification command signal output from the controller 5A will be described with reference to FIG. 13.

Figure 13:
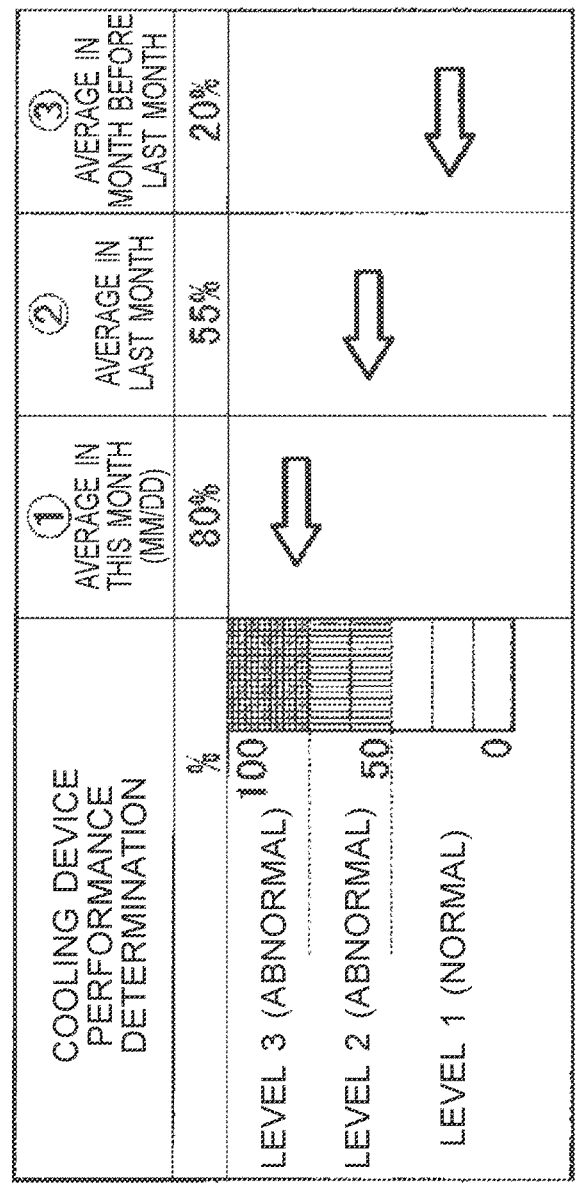
FIG. 13 illustrates display of a determination result of cooling performance in a modification.

FIG. 13 illustrates display of a determination result of the cooling performance in the present modification.

In the present modification, the controller 5A is configured to record a cumulative time of the engine operating time ET and a cumulative time of a time DT during which the cooling performance of the radiator 31 or the oil cooler 32 is decreased (hereinafter, simply referred to as "cooling performance decreased time DT"), and display a determination result of the cooling performance by the month, such as this month, last month, and a month before last month. Specifically, it may be configured to use a time ratio of the cooling performance decreased time DT relative to the engine operating time ET (=DT/ET[%]) as an index of clogging determination (abnormality determination) of the radiator 31 or the oil cooler 32 and divide the levels of the clogging or those of decrease in the cooling performance in accordance with the numerical values of DT/ET so as to display a stage of the clogging or that of decrease in the cooling performance.

For example, it may be configured to set the case where DT/ET is equal to or more than 75% (DT/ET≥75%) as an abnormal level 3 and describe it in the service inspection report such that "The cooling device has been clogged or an error has occurred in the cooling system. Please inspect it immediately" while setting the case DT/ET is 50% or more and less than 75% (50%≤DT/ET<70%) as an abnormal level 2 and describing it in the service inspection report such that "The cooling device has been clogged or an error has occurred in the cooling system. Please inspect it". Furthermore, it may be configured to set the case where DT/ET is less than 50% (DT/ET<50%) as a normal level 1 and describe it in the service inspection report such that "The cooling device is not clogged. The cooling system is operating normally".

The embodiments described above have been explained in detail in order to clarify the present invention, but are not necessarily limited to those having all the configurations described. In addition, a part of the configuration of the present embodiments can be replaced with that of another embodiment, and the configuration of another embodiment can be added to the configuration of the present embodiments. Furthermore, it is possible to add, delete, or replace another configuration with respect to a part of the configuration of the present embodiments.

For example, in the above-described embodiments, the cooling water temperature sensor 41 is provided with respect to the radiator 31 and the hydraulic oil temperature sensor 42 is provided with respect to the oil cooler 32. Meanwhile, when the radiator 31 is clogged and the cooling water temperature CW increases, the hydraulic oil temperature HW similarly increases. Accordingly, it is sufficient to detect either the cooling water temperature CW or the hydraulic oil temperature HW by the sensor. Therefore, the wheel loader 1 may be provided with a fluid temperature sensor (cooling water temperature sensor 41 or hydraulic oil temperature sensor 42) for detecting at least the cooling water temperature CW or the hydraulic oil temperature HW.

Furthermore, in the above-described embodiment, when the clogging occurrence determination section 52 determines that clogging is occurring, the interval time setting section 53 sets the interval time for rotating the cooling fan 33 in the forward direction and the reverse direction to the shortened interval time T2 which is shorter than the normal interval time T1. Meanwhile, the interval time for rotating the cooling fan 33 in the forward direction and the reverse direction is not necessarily shorten, but may remain the normal interval time T1.

Still further, in the above-described embodiment, the cooling fan drive device 39 is a hydraulically driven type device. Meanwhile, the cooling fan drive device 39 is not limited thereto, but may be an electrically driven type device using an electric motor. In addition, the cooling fan 33 may not necessarily be driven by using the cooling fan drive device 39, but may be driven by being coupled to the output shaft 30A of the engine 30.

Still further, in the above-described embodiment, the radiator 31 and the oil cooler 32 have been described as one of the aspects of the cooling device. Meanwhile, the cooling device is not limited thereto, and for example, a torque converter oil cooler may be included therein in the case of a torque converter driven type vehicle.

In the above-described embodiment, the wheel loader 1 has been described as one of the aspects of a work machine, meanwhile, the work machine is not limited thereto. The present invention can be applied to a work machine as long as it is provided with a cooling device configured to cool at least the cooling water for cooling the engine 30 or the hydraulic oil for actuating the working device 2 (for example, a hydraulic excavator).

REFERENCE SIGNS LIST

1: wheel loader (work machine)
2: working device
5, 5A: controller
30: engine
31: radiator (cooling device)
32: oil cooler (cooling device)
33: cooling fan
39: cooling fan drive device
41: cooling water temperature sensor (fluid temperature sensor)
42: hydraulic oil temperature sensor (fluid temperature sensor)
44: outside air temperature sensor
61: alarm buzzer (notification device)
62: user management system (notification device)
AW: outside air temperature
AWth: predetermined outside air temperature threshold
CW: cooling water temperature (fluid temperature)
HW: hydraulic oil temperature (fluid temperature)
W1: predetermined first fluid temperature threshold
W2: predetermined second fluid temperature threshold

The invention claimed is:

1. A work machine comprising:
a main body;
an engine mounted on the main body;
a working device attached to the main body and driven by hydraulic pressure;
a cooling device configured to cool at least cooling water for cooling the engine or hydraulic oil for actuating the working device; and a cooling fan configured to introduce outside air and blow the outside air toward the cooling device, wherein the work machine further comprises:

an outside air temperature sensor configured to detect outside air temperature;

a fluid temperature sensor configured to detect at least cooling water temperature or hydraulic oil temperature;

a controller configured to determine a clogging continuation state in the cooling device; and a notification device configured to notify that maintenance of the cooling device is necessary due to continuation of the clogging in the cooling device, and the controller is further configured to:

determine whether clogging is occurring in the cooling device based on the outside air temperature detected by the outside air temperature sensor and fluid temperature detected by the fluid temperature sensor;

determine whether the clogging continues in the cooling device based on a clogging occurrence ratio in the cooling device while the engine is operating; and in a case of determining that the clogging continues in the cooling device, output a notification command signal for providing the notification device with a command to notify that maintenance of the cooling device is necessary.

2. The work machine according to claim 1, further comprising a cooling fan drive device configured to drive the cooling fan, wherein the controller is configured to:

count the cumulative number of times a reverse rotation command signal for switching a rotation direction of the cooling fan from a forward direction to a reverse direction is output to the cooling fan drive device while the engine is operating, and the number of times of clogging signal output that is the number of times the reverse rotation command signal is output to the cooling fan drive device while it is determined that the clogging is occurring in the cooling device, respectively; and based on a ratio of the number of times of clogging signal output relative to the cumulative number of times of reverse rotation command signal output, determine whether the clogging continues in the cooling device.

3. The work machine according to claim 1, wherein the controller is further configured to:

measure an operating time of the engine and a clogging determination time during which it is determined that the clogging is occurring in the cooling device, respectively; and based on a ratio of the clogging determination time relative to the operating time, determine whether the clogging continues in the cooling device.

4. The work machine according to claim 1, wherein the controller is further configured to calculate the clogging occurrence ratio in the cooling device while the engine is operating based on an operating time of the engine per day or per month.

5. The work machine according to claim 1, further comprising a cooling fan drive device for driving the cooling fan, wherein the controller is further configured to:

output a switching command signal to the cooling fan drive device to rotate the cooling fan in a forward direction and a reverse direction at a normal interval time which has been initially set after the engine is started; and in a case of determining that the clogging is occurring in the cooling device, output the switching command signal to the cooling fan drive device to rotate the cooling fan in the forward direction and the reverse direction at an interval time which is shorter than the normal interval time.

6. The work machine according to claim 1, wherein the controller is further configured to determine that the clogging is occurring in the cooling device in a case where the fluid temperature reaches a predetermined first fluid temperature threshold under a low temperature condition in which the outside air temperature is lower than a predetermined outside air temperature threshold, or in a case where the fluid temperature reaches a predetermined second fluid temperature threshold that is higher than the predetermined first fluid temperature threshold under a high temperature condition in which the outside air temperature is equal to or higher than the predetermined outside air temperature threshold.

7. The work machine according to claim 6 wherein each of the predetermined first fluid temperature threshold and the predetermined second fluid temperature threshold is set lower than temperature at which the cooling water or the hydraulic oil overheats.

* * * * *